United States Patent
Keller et al.

(10) Patent No.: US 6,633,936 B1
(45) Date of Patent: Oct. 14, 2003

(54) ADAPTIVE RETRY MECHANISM

(75) Inventors: James B. Keller, Palo Alto, CA (US); Chun H. Ning, Cupertino, CA (US); Kwong-Tak A. Chui, Cupertino, CA (US); Mark D. Hayter, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 386 days.

(21) Appl. No.: 09/670,362

(22) Filed: Sep. 26, 2000

(51) Int. Cl.$^7$ .................. G06F 13/00; G06F 13/36
(52) U.S. Cl. .................. 710/107; 710/306; 710/110
(58) Field of Search .................. 710/107, 110, 710/118, 125, 306, 308

(56) References Cited

U.S. PATENT DOCUMENTS

| | | | | |
|---|---|---|---|---|
| 3,992,699 A | * | 11/1976 | Krumbach | 711/110 |
| 5,884,052 A | * | 3/1999 | Chambers et al. | 710/107 |
| 6,021,483 A | * | 2/2000 | Adar et al. | 712/29 |
| 6,081,859 A | * | 6/2000 | Munguia | 710/107 |
| 6,282,598 B1 | * | 8/2001 | Manabe | 710/107 |
| 6,289,406 B1 | * | 9/2001 | Chambers et al. | 710/107 |

OTHER PUBLICATIONS

PCI Local Bus Specification, Revision 2.2, Dec. 18, 1998, pp. 47–67, 75–88.

Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.

* cited by examiner

*Primary Examiner*—Rupal Dharia
*Assistant Examiner*—Trisha Vu
(74) *Attorney, Agent, or Firm*—Lawrence J. Merkel; Meyertons, Hood, Kivlin, Kowert & Goetzel, P.C.

(57) ABSTRACT

An adaptive retry mechanism may record latencies of recent transactions (e.g. the first data transfer latency), and may select a retry latency from two or more retry latencies. The retry latency may be used for a transaction, and may specify a point in time during the transaction at which the transaction is retried if the first data transfer has not yet occurred. In one implementation, the set of retry latencies includes a minimum retry latency, a nominal retry latency, and a maximum retry latency. The nominal retry latency may be set slightly greater than the expected latency of transactions in the system. The minimum retry latency may be less than the nominal retry latency and the maximum retry latency may be greater than the nominal retry latency. If latencies greater than the nominal retry latency but less than the maximum retry latency are being experienced, the maximum retry latency may be selected. On the other hand, if latencies greater than the maximum retry latency are being experienced, the minimum retry latency may be selected.

68 Claims, 9 Drawing Sheets

ADAPTIVE RETRY MECHANISM

BACKGROUND OF THE INVENTION

1. Field of the Invention

This invention is related to the field of bus interfaces, and more particularly, to retry mechanisms in bus interfaces.

2. Description of the Related Art

Generally, devices in a system may use a bus to communicate. Particularly, it is frequent that a variety of peripheral devices are coupled to a bus (e.g. the Peripheral Component Interconnect bus, or PCI bus) for communicating with other devices (either directly connected to the bus or indirectly through one or more bus bridges). The bus is a shared resource among the devices coupled to the bus, and thus efficient use of the bandwidth available on the bus may be important to overall system performance. During the time that a transaction is active on the bus, other transactions may be precluded from being initiated or completing. For example, the PCI bus is a shared address/data bus in which the address and data are transferred on the same lines (but at different times). A transaction initiated on the PCI bus consumes bus bandwidth until the data is transferred or until the transaction is retried. Other buses may implement separate address and data buses, but even these buses may have wasted bandwidth. For example, if the data bus is granted to a transaction, the transaction consumes data bus bandwidth until the data is actually transferred.

In order to enforce efficient bandwidth usage, some buses (such as the PCI bus) may specify a maximum latency that a target device may delay before performing at least the first data transfer of a read transaction. If the target device cannot transfer data within the maximum latency, then the target device must retry the transaction (thus freeing the bus for use to perform another transaction). In the time between the retry and the subsequent reattempt of the transaction by the initiating device, the target device may continue to make progress toward being able to transfer data. For example, for a read transaction, the target device may continue to fetch the requested data internally.

Many PCI bus devices currently implement a static counter which counts to a timeout value (e.g. the maximum specified latency or some predetermined latency less than the maximum latency) and, if the timeout is reached without data available for transfer, the PCI device retries the transaction. Other PCI devices (particularly long latency devices) may implement a policy of always retrying a read transaction the first time the read transaction is presented on the PCI bus, and initiating an internal read to begin fetching the requested data. Still further, other devices may implement each of the above policies, selectable as modes for the device under software control.

Unfortunately, the aforementioned mechanisms tend to be wasteful of PCI bus bandwidth. A more efficient retry mechanism is therefore desired.

SUMMARY OF THE INVENTION

The problems outlined above are in large part solved by an adaptive retry mechanism described herein. The mechanism may record latencies of recent transactions (e.g. the first data transfer latency), and may select a retry latency from two or more retry latencies. The retry latency may be used for a transaction, and may specify a point in time during the transaction at which the transaction is retried if the first data transfer has not yet occurred. Since the selected retry latency is based on the latencies currently being experienced in the system, the retry latency may be dynamically adjusted to more efficiently use bus bandwidth. In one embodiment, the mechanism may be used on the PCI bus although any bus which allows for retry of transactions may employ the mechanism.

The recorded latencies may be measured directly during the recent transactions, or the latencies may be calculated or estimated from multiple internal states of the system. For example, in one embodiment, the latencies may be calculated based on the memory controller's memory read latency, the number of transactions queued in the memory controller, and the amount of traffic on the system bus. The number of transactions queued in the memory controller may increase the latency for a particular transaction since some or all of the queued transactions may be performed by the memory controller prior to the particular transaction. The amount of traffic on the system bus may increase the latency for a particular transaction by delaying access to the bus in response to the particular transaction.

In one implementation, the set of retry latencies includes a minimum retry latency, a nominal retry latency, and a maximum retry latency. The nominal retry latency may be set slightly greater than the expected latency of transactions in the system. The minimum retry latency may be less than the nominal retry latency and the maximum retry latency may be greater than the nominal retry latency. If latencies greater than the nominal retry latency but less than the maximum retry latency are being experienced, the maximum retry latency may be selected, thus avoiding retrying transactions just before the data arrives. On the other hand, if latencies greater than the maximum retry latency are being experienced, the minimum retry latency may be selected, thus more rapidly retrying transactions and therefore freeing bus bandwidth for other transactions.

Broadly speaking, a method is contemplated. Latencies of transactions on a bus are determined. Each latency represents a time period from a first event of a corresponding transaction to a second event of the corresponding transaction. A first retry latency for a first transaction is selected from a plurality of retry latencies responsive to latencies of N previous transactions (N is a positive integer). The first retry latency is indicative of a point in time, measured from the first event of the first transaction on the bus, that the first transaction is retried on the bus if the second event of the first transaction does not occur before the point in time.

Additionally, an apparatus is contemplated, comprising a buffer and a circuit coupled to the buffer. The buffer is configured to store latencies of transactions on a bus, each of the latencies representing a period of time from a first event of a corresponding transaction to a second event of the corresponding transaction. The circuit is configured to select a first retry latency for a first transaction from a plurality of retry latencies responsive to latencies of N previous transactions, wherein N is a positive integer. The first retry latency is indicative of a point in time, measured from the first event of the first transaction on the bus, that the first transaction is retried on the bus if the second event of the first transaction does not occur before the point in time.

BRIEF DESCRIPTION OF THE DRAWINGS

Other objects and advantages of the invention will become apparent upon reading the following detailed description and upon reference to the accompanying drawings in which.

Figure 1:
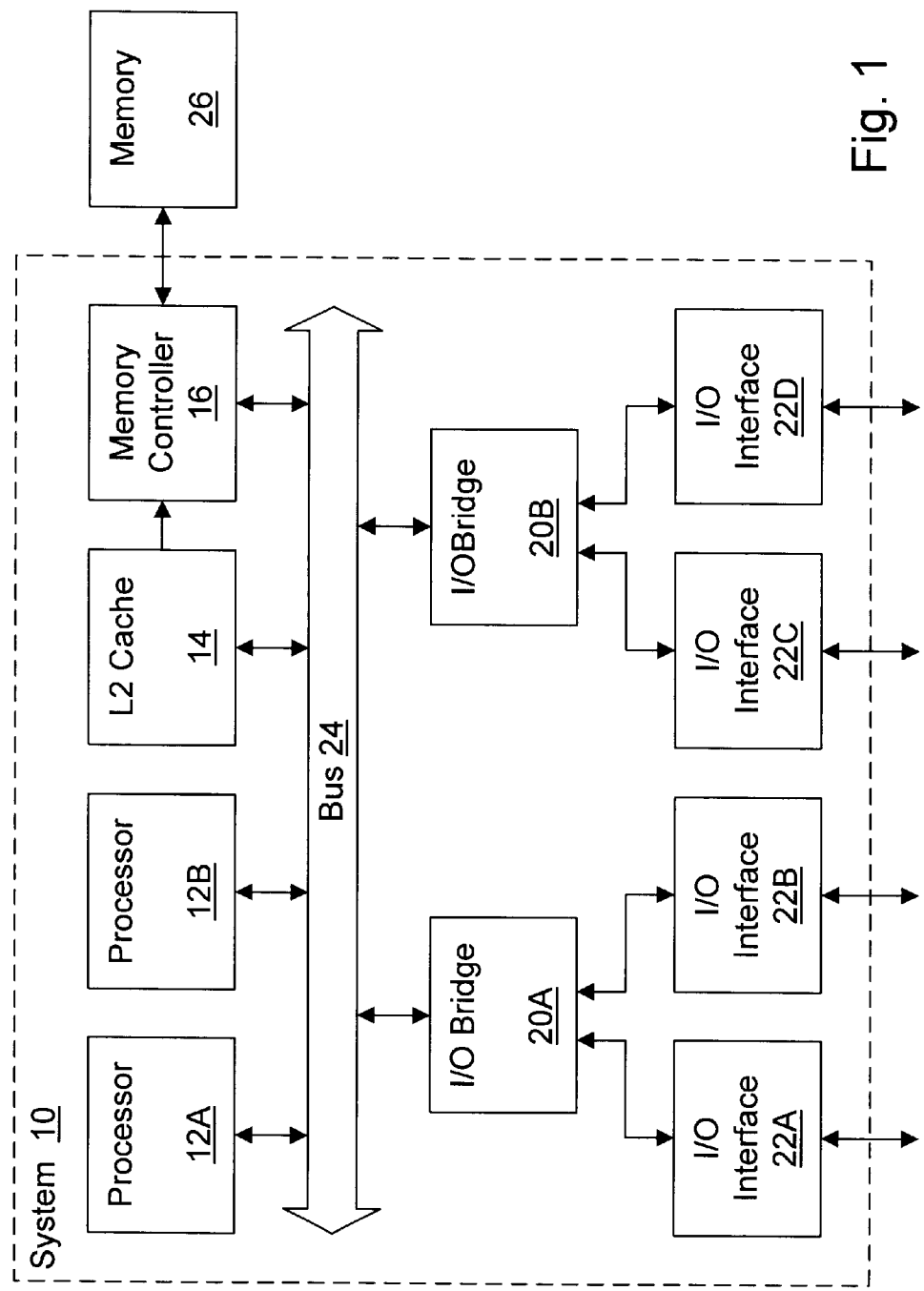
FIG. 1 is a block diagram of one embodiment of a system including an input/output (I/O) interface.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. As illustrated in FIG. 1, each of processors 12A–12B, L2 cache 14, memory controller 16, and I/O bridges 20A–20B are coupled to bus 24. Thus, each of processors 12A–12B, L2 cache 14, memory controller 16, and I/O bridges 20A–20B may be an agent on bus 24 for the illustrated embodiment. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. While system 10 as shown in FIG. 1 includes two processors, other embodiments may include one processor or more than two processors, as desired.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. Other embodiments may not include L2 cache 14 and memory controller 16 may respond to each memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for I/O bridge 20A and I/O interfaces 22C–22D for I/O bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that I/O interface 22A–22B. Similarly, I/O bridge 20B generally performs transactions on bus 24 on behalf of I/O interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) I/O fabric developed by Advanced Micro Devices, Inc. (e.g. I/O interface 22B). Other I/O interfaces may be bridged by I/O bridge 20B. Other implementations may bridge any combination of I/O interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

Bus 24 may be a split transaction bus, in one embodiment. Bus 24 may employ a distributed arbitration scheme, in one embodiment. In one embodiment, bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that system 10 (and more particularly processors 12A–12B, L2 cache 14, memory controller 16, I/O interfaces 22A–22D, I/O bridges 20A–20B and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 24 may not be pipelined, if desired.

It is noted that, while FIG. 1 illustrates I/O interfaces 22A–22D coupled through I/O bridges 20A–20B to bus 24, other embodiments may include one or more I/O interfaces 22A–22D directly coupled to bus 24, if desired.

Adaptive Retry

Figure 2:
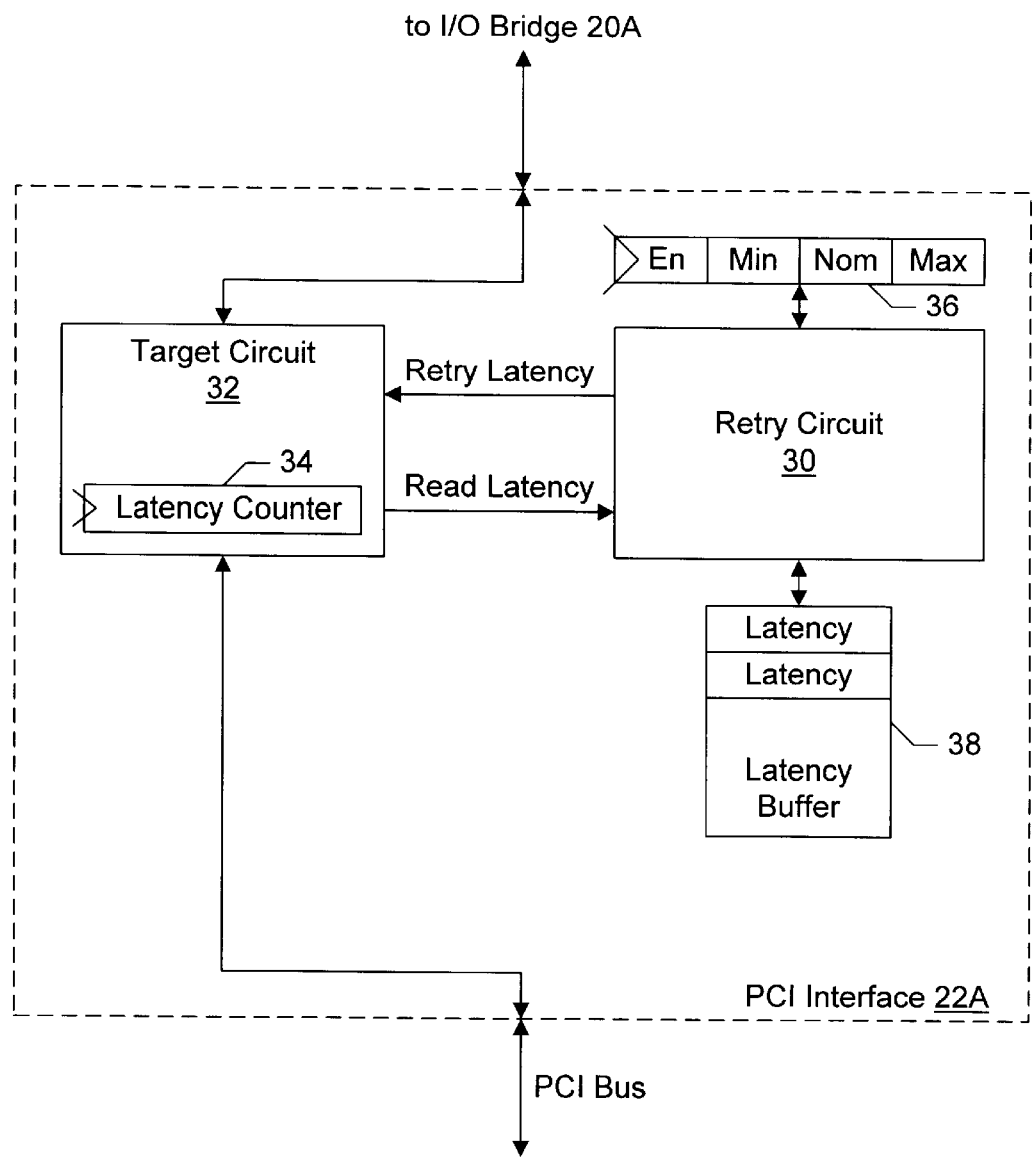
FIG. 2 is a block diagram of one embodiment of the I/O interface shown in FIG. 1.

Turning now to FIG. 2, a block diagram is shown illustrating one embodiment of I/O interface 22A. Other embodiments are possible and contemplated. More particularly, in the illustrated embodiment, I/O interface 22A may be a PCI interface 22A. As shown in FIG. 2, PCI interface 22A includes a retry circuit 30, a target circuit 32 including a latency counter 34, a configuration register 36, and a latency buffer 38. Target circuit 32 is coupled to communicate with I/O bridge 20A and to communicate on the PCI bus. Retry circuit 30 is coupled to target circuit 32 and is coupled to latency buffer 38 and configuration register 36.

Generally speaking, retry circuit 30 is configured to select a retry latency from one of several retry latencies and to convey the selected retry latency to target circuit 32. Target circuit 32 uses the selected retry latency as the retry latency for transactions received on the PCI bus which target circuit 32 decodes as the target of the transaction. If the latency of the transaction equals or exceeds the retry latency and a data transfer has not yet occurred for the transaction, target circuit 32 retries the transaction on the PCI bus. Generally, target circuit 32 may serve as a proxy for targets on bus 24 (e.g. memory 26) of transactions initiated on the PCI bus by a PCI device (not shown). Other circuitry within PCI interface 22A (not shown) may handle transactions initiated by PCI interface 22A on the PCI bus (e.g. in response to transactions by processors 12A–12B on bus 24).

The selected retry latency may be based on the latencies to the first data transfer ("first data transfer latencies") of previous transactions, and thus may be selected to adapt to the latency that is being experienced in system 10. If transactions are experiencing first data transfer latencies slightly greater than the currently selected retry latency, than the retry latency may be increased to avoid retrying transactions just before data corresponding to the transaction is ready for transfer on the PCI bus. If transactions are experiencing even higher first data transfer latencies, the retry latency may be reduced, causing transactions to be retried earlier and thus freeing more bus bandwidth for use by other transactions. Accordingly, the retry latency may be adapted to the conditions existing in the system at a given time.

For example, in one embodiment, three retry latencies may be employed: a minimum retry latency, a nominal retry latency, and a maximum retry latency. The nominal retry latency may be initially selected by retry circuit 30, and may be just greater than the normally expected first data transfer latency for a transaction targeting a device on bus 24 (e.g. memory 26). If system 10 is experiencing the expected amount of traffic on bus 24, then data may be transferred on the PCI bus for most transactions with a latency less than the nominal retry latency. Transactions which do not result in a first data transfer prior to the nominal retry latency are retried earlier than they might otherwise be (e.g. if the maximum specified retry latency in the PCI specification were used), freeing additional bandwidth for use by other transactions. However, if system 10 is experiencing slightly more traffic than expected, the first data transfer latency of transactions may increase above the nominal retry latency, and thus transactions may be retried more frequently. If the first data transfer latencies are still less than the maximum retry latency, retry circuit 30 may select the maximum retry latency for subsequent transactions. Thus, transactions may not be retried even though a somewhat longer first data transfer latency is being experienced. On the other hand, if system 10 is experiencing significantly more than the expected traffic on bus 24, the first data transfer latencies of transactions may exceed the maximum retry latency. In this case, retry circuit 30 may select the minimum retry latency. Thus, transactions may be retried in a relatively short period of time, allowing other transactions to be performed on the PCI bus and allowing better use of the bandwidth of the PCI bus when traffic on bus 24 is high. As latencies of transactions return to a more expected level, the retry latency may be selected as the nominal retry latency again.

The PCI bus specifies a maximum latency for transfer of the first data for a transaction, measured from the beginning of the transaction. The retry latencies from which retry circuit 30 selects may be less than the specified latency (or the maximum one of the retry latencies may be equal to the specified latency and other retry latencies may be less than the specified latency). In the illustrated embodiment, the latencies are programmable in configuration register 36 (e.g. the Min field of configuration register 36 may store the minimum retry latency, the Nom field of configuration register 36 may store the nominal retry latency, and the Max field of configuration register 36 may store the maximum retry latency). Additionally, use of the adaptive retry mechanism may be enabled or disabled using an enable indication (En) in configuration register 36. If the mechanism is disabled, retry circuit 30 may provide a predetermined retry latency (e.g. the retry latency specified by the PCI specification or some other predetermined lower latency) as the retry latency to be used by target circuit 32.

If target circuit 32 decodes a read transaction received on the PCI bus as a target, target circuit 32 forwards the read transaction to I/O bridge 20A (or directly on to bus 24, in other embodiments) and receives the read data from I/O bridge 20A (or directly). Target circuit 32 transmits the received data on the PCI bus. Additionally, target circuit 32 tracks the latency of the read transaction in latency counter 34. The latency may include time to forward the transaction to bus 24, time to fetch and transfer the requested read data on bus 24, and time to return the read data on to the PCI bus. If the latency of the read transaction equals or exceeds the retry latency provided by retry circuit 30 and the first data transfer has not yet occurred, target circuit 32 may retry the transaction on the PCI bus. The transaction may be reattempted by the initiator at a later time, and the read data may be available in the target circuit 32 at that time.

The latency of the read transaction may be measured directly during the read transaction, or the latencies may be calculated or estimated from multiple internal states of the system. For example, in one embodiment, the latency may be calculated based on the memory controller's memory read latency, the number of transactions queued in the memory controller 16, and the amount of traffic on the system bus 24. The number of transactions queued in the memory controller may increase the latency for the read transaction since some or all of the queued transactions may be performed by the memory controller prior to the read transaction. The amount of traffic on the system bus 24 may increase the latency for the read transaction by delaying access to the bus 24 by I/O bridge 20A (or target circuit 32) in response to the read transaction.

Even if the transaction is retried, target circuit 32 may continue to track the latency of the transaction until the data is provided from bus 24 to target circuit 32. In either case, target circuit 32 provides the first data transfer latency of the read transaction to retry circuit 30, which stores the latency in latency buffer 38. Generally, latency buffer 38 may store the first data transfer latencies of the most recent N read transactions. In other words, retry circuit 30 may operate latency buffer 38 as a first-in, first-out (FIFO) buffer. Thus, retry circuit 30 may replace the least recent latency in latency buffer 38 with the latency provided by target circuit 32. The number of latencies stored in latency buffer 38 may be at least one, and is generally a positive integer. The number of latencies may be selected according to design choice. Larger numbers of latencies may provide a more accurate portrayal of the latencies currently being experienced by the system, but may also result in a slower reaction by retry circuit 30 to changing latency conditions. In one particular implementation, the number of latencies stored may be two.

Retry circuit 30 uses the stored latencies to select a retry latency for target circuit 32. More particularly, retry circuit 30 may maintain the currently selected retry latency unless at least a predetermined number of latencies indicate that a change in retry latency is in order, in which case retry circuit 30 may change the latency. In an embodiment storing two latencies, retry circuit 30 may change the retry latency if both of the previous latencies indicate that the change should be performed. Other embodiments storing larger numbers of latencies may not require all of the previous latencies to indicate a change before making the change. Such embodiments may, for example, set the predetermined number of latencies at a majority of the latencies (i.e. one more than half). Other embodiments may use other predetermined numbers of latencies, such a two-thirds of the latencies or any other suitable portion of the latencies. The selection of retry latencies for several exemplary embodiments are illustrated further below.

The latency measured by latency counter 34 and the retry latency may be represented in any suitable fashion. For example, the latencies may be measured in clock cycles of the clock corresponding to the PCI bus. Other embodiments may measure latencies in other fashions (e.g. in nanoseconds, or according to some other clock).

It is noted that, while the various retry latencies selectable by retry circuit 30 are programmable in the present embodiment, other embodiments may fix the selectable retry latencies in hardware, if desired. Furthermore, programmable embodiments in which multiple configuration registers similar to configuration register 36 are used to store the retry latencies and/or enable are contemplated. Generally, configuration registers such as configuration register 36 may be read or written by software (e.g. executing on processors 12A–12B) to program the desired latencies. For example, the configuration registers may be mapped to one or more addresses within the address space supported by bus 24, and loads and stores to the addresses may be used to read and write the configuration registers.

It is noted that, while the present embodiment illustrates PCI interface 22A as using the adaptive retry mechanism of retry circuit 30, any device capable of being a target of a transaction may employ the adaptive retry mechanism. Furthermore, the mechanism may be used separate from any particular device, measuring first data transfer latencies of transactions on the bus as a whole and setting the retry latency for the bus as a whole.

It is noted that, while the above discussion describes the setting of retry latencies for read transactions, other embodiments may employ the setting of retry latencies for write transactions or for both reads and writes. Write transactions may be delayed by a target, for example, if the target includes a buffer for the write data and the buffer becomes full. In such a case, retrying the write transaction may allow other transactions to proceed while the target empties the write buffer (or at least one or more entries).

It is further noted that, while the above discussion refers to the latency for the first data transfer of a transaction, some transactions may include more than one data transfer. An additional latency requirement may be applied to the additional data transfers (e.g., measured from the preceding data transfer). The selection of a retry latency for the subsequent data transfers may similarly be varied as described above and adapted to the latencies being experienced in the system.

It is noted that, while the above discussion refers to tracking the latency of one transaction using latency counter 34, target circuit 32 may be configured to track multiple outstanding transactions using multiple latency counters similar to latency counter 34.

It is noted that, while the present embodiment uses the PCI bus, any bus which allows for retry of transactions may employ the above described mechanism. As used herein, the term "retry" refers to the termination of a transaction before completion of the transaction. The retried transaction may be reattempted at a later point in time. Depending on the bus protocol, if data is transferred prior to the transaction being retried, that data may or may not be retransferred when the transaction is reattempted.

As used herein, the term "transaction" refers to a communication on a bus. A transaction may be initiated by an initiator, or source, and may be a communication between the source and at least one target. Transactions may be read or write transactions, in one embodiment. A transaction may include an address identifying the target of the transaction, and may include one or more data transfers. A "target" of a transaction is a device to be communicated with by the initiator (or a device acting as a proxy for the target). In one embodiment, a target may be selected by the address transmitted in the transaction. Other embodiments may indicate target selection by the initiator through other control signals, as desired. The "beginning" of a transaction is the initiation of the transaction on the bus. For example, a transaction may begin with the driving of the address on the bus, and any concurrent control information indicating the nature of the transaction. On the PCI bus, the beginning of the transaction may be indicated by the assertion of the FRAME# signal. A "data transfer" is one transmission of data on the bus, and may include up to the maximum number of bytes which may be concurrently transmitted on the bus. A given read or write transaction may include at least one data transfer, and may include multiple data transfers in some embodiments. For example, on the PCI bus, one data transfer may occur each clock cycle after the address has been presented (except for the bus turnaround cycle immediately after the address for reads).

As used herein, the term "latency" refers to a period of time elapsing from a first event until a subsequent second event of a transaction. The first and second events may be any occurrence within the transaction (e.g. the beginning of the transaction, the termination of the transaction, the assertion or deassertion of any signal, an address transfer, a data transfer, a response to an earlier portion of the transaction such as a coherency response, etc.). The term "retry latency" may refer to the period of time elapsing from a first event in the transaction to the retry of the transaction in the absence of a second event. Thus, given the occurrence of the first event at a particular time, the retry latency may identify a point in time at which the transaction is to be retried if the second event does not occur prior to that point in time. The second event may be, for example, a data transfer. The first event may be the beginning of the transaction, for a first data transfer latency, or may be the most recent data transfer, for a subsequent data transfer in the transaction.

Figure 3:
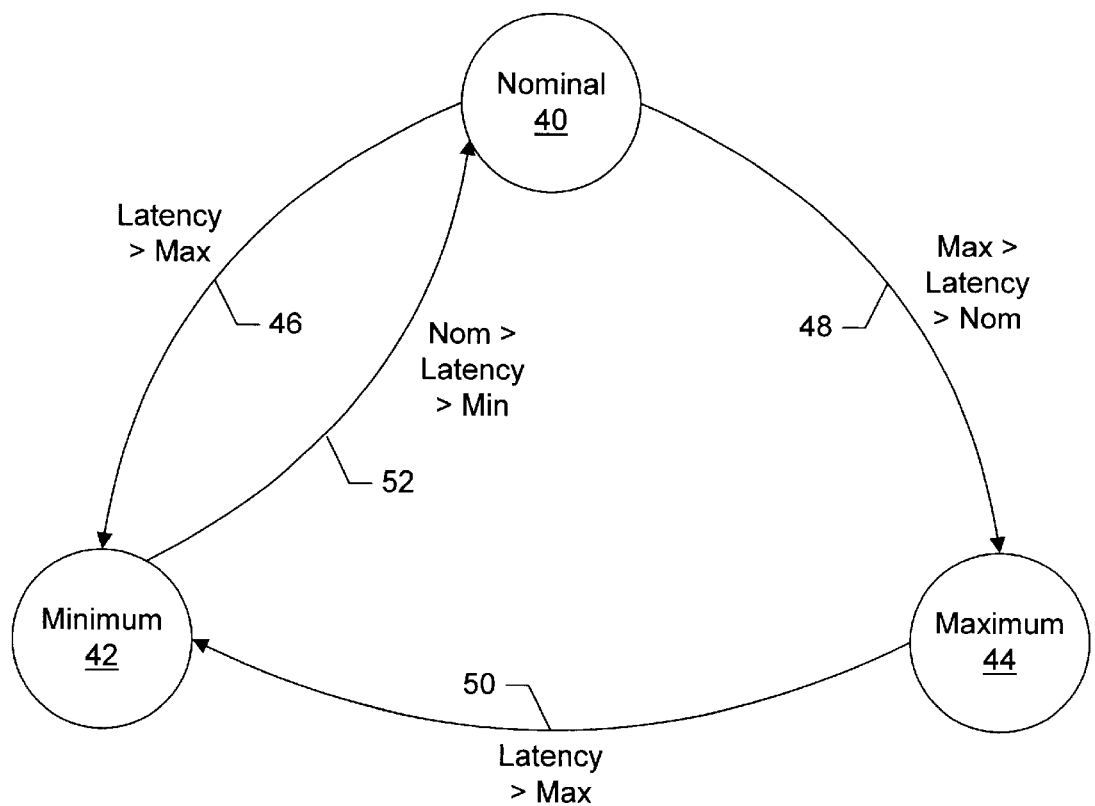
FIG. 3 is one embodiment of a state machine which may be implemented by one embodiment of the I/O interface shown in FIG. 2.
Figure 4:
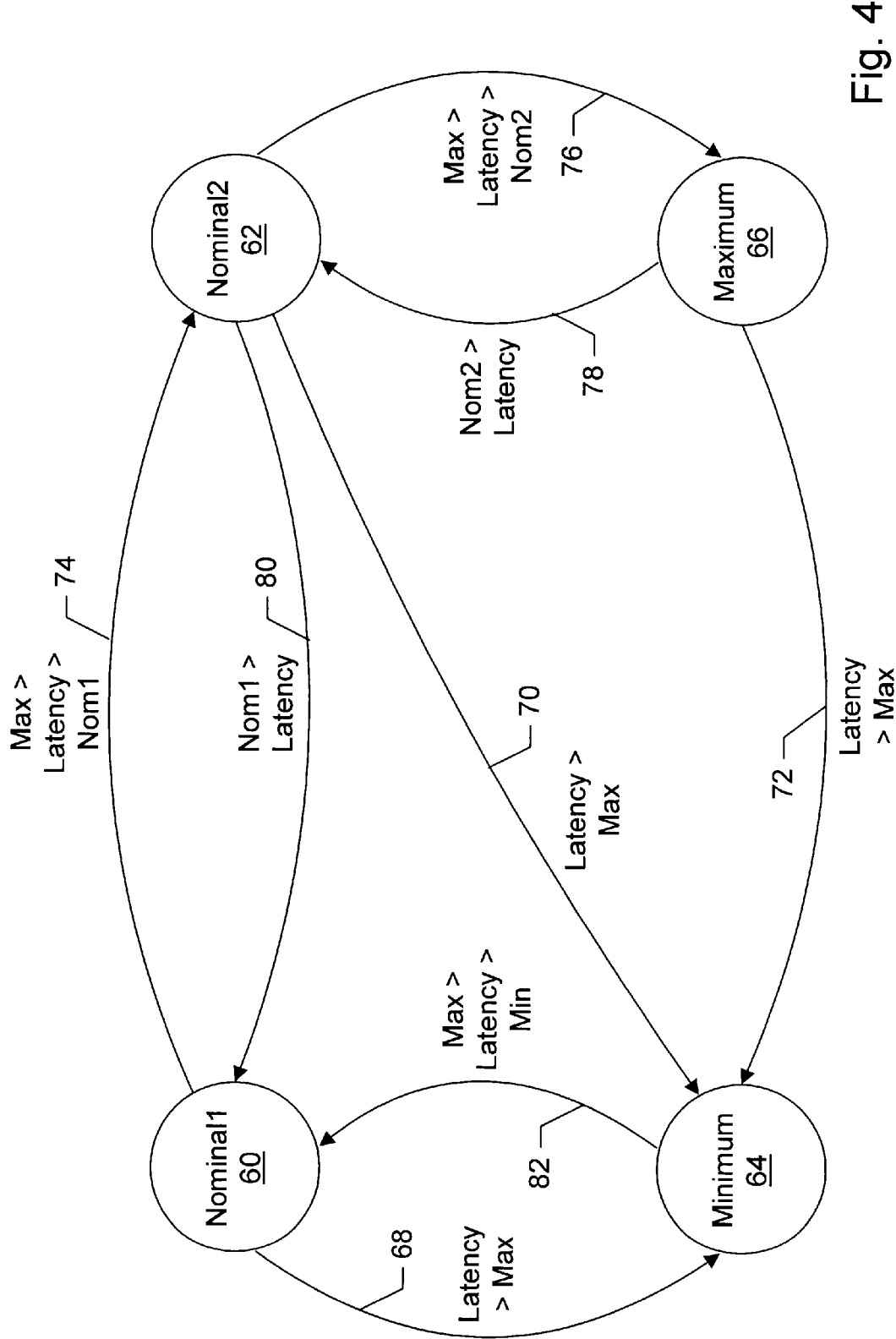
FIG. 4 is a second embodiment of a state machine which may be implemented by one embodiment of the I/O interface shown in FIG. 2.
Figure 5:
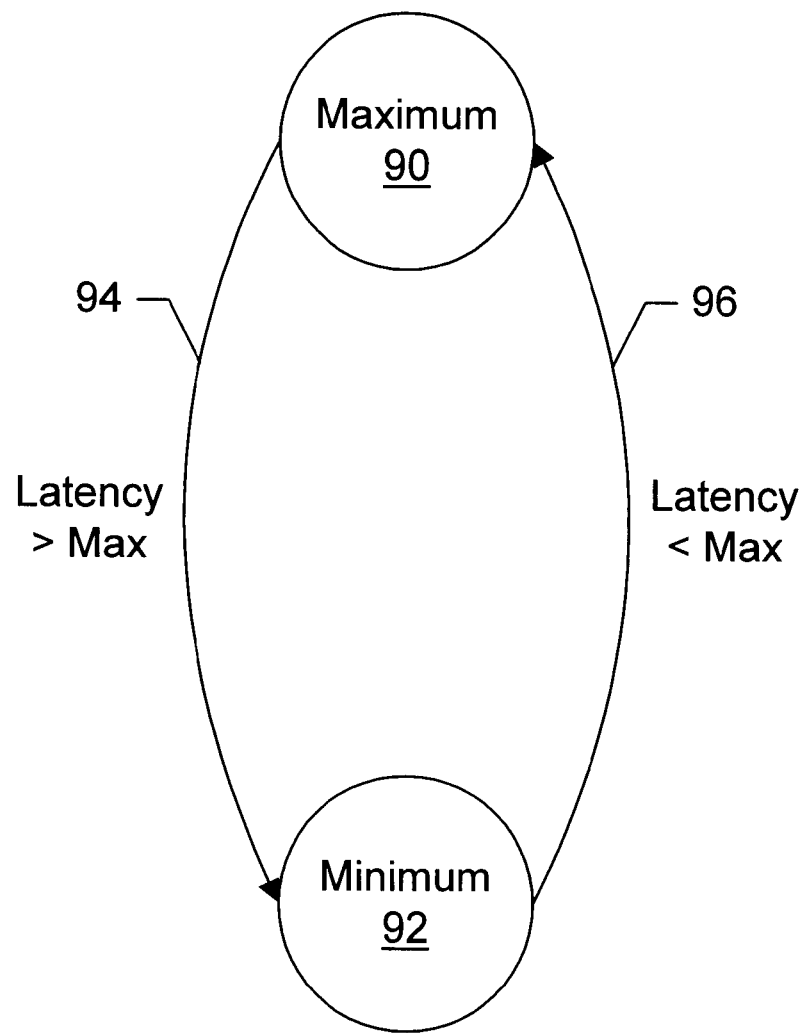
FIG. 5 is a third embodiment of a state machine which may be implemented by one embodiment of the I/O interface shown in FIG. 2.

Turning now to FIGS. 3–5, several exemplary state machines for various embodiments of retry circuit 30 are illustrated. Generally, each of the state machines remains in the same state unless the state is changed according to the illustrated transition arcs. The transitions are based on the latencies of the N previous transactions as compared to the various retry latencies. More particularly, the latencies of at least the predetermined number of the N previous transactions meet the requirements of the transition arc for that transition to occur. The latencies of at least the predetermined number of the N previous transactions will be more succinctly referred to in the below discussion of the state machines as the previous latency.

Turning next to FIG. 3, a state machine diagram illustrating a first exemplary state machine that may be employed by retry circuit 30 is shown. Other embodiments are possible and contemplated. In the illustrated embodiment, the state machine includes a nominal state 40, a minimum state 42, and a maximum state 44. The state machine of FIG. 3 may correspond to an embodiment of retry circuit 30 which implements three retry latencies: a minimum retry latency, a nominal retry latency, and a maximum retry latency. In the nominal state 40, retry circuit 30 selects the nominal retry latency. Similarly, in the minimum state 42, retry circuit 30 selects the minimum retry latency; and, in the maximum state 44, retry circuit 30 selects the maximum retry latency.

The state machine may initially (e.g., upon reset) begin at nominal state 40, and thus retry circuit 30 may initially select the nominal retry latency. If the previous latency is greater than the maximum retry latency (arc 46), the state machine transitions to the minimum state 42. If the previous latency is less than the maximum retry latency and greater than the nominal retry latency, the state machine transitions to the maximum state 44 (arc 48).

If the state machine is in maximum state 44, the state machine transitions to the minimum state 42 if the previous latency is greater than the maximum retry latency (arc 50).

If the state machine is in minimum state 42, the state machine transitions to nominal state 40 if the previous latency is greater than the minimum retry latency and less than the nominal retry latency (arc 52).

The state machine illustrated in FIG. 3 may also be represented by the following lines of pseudo code:

if (previous latency>maximum retry latency)
{
    selected retry latency=minimum retry latency;
}
if (current retry latency!=minimum retry latency && maximum retry latency>previous latency>nominal retry latency)
{
    selected retry latency=maximum retry latency
}
if (current retry latency==minimum retry latency && nominal retry latency>previous retry latency>minimum retry latency)
{
    selected retry latency=nominal retry latency
}

The state machine illustrated in FIG. 3 may provide for better utilization of bus bandwidth in at least two ways. First, rather than frequently retrying transactions whose first data transfer latency may be slightly higher than expected, the state is changed to maximum state 44 and the retry latency is increased to the maximum retry latency. Thus, if first data transfers are occurring in less than the maximum retry latency, the transactions may not be retried (and thus may not consume more bandwidth by being reattempted). Second, if the first data transfer latency exceeds the maximum retry latency, the state is changed to the minimum state 42 and thus the transactions are more rapidly retried, freeing bus bandwidth which might otherwise be consumed by the retried transaction waiting for data.

In another embodiment, the state machine of FIG. 3 may include a transition from the minimum state 42 to the maximum state 44 if the previous latency is less than the maximum retry latency but greater than the nominal retry latency. In yet another embodiment, the state machine of FIG. 3 may include a transition from the maximum state 44 to the nominal state 40 if the previous latency is less than the nominal retry latency. Yet another embodiment may include both of the above additional transitions.

Turning next to FIG. 4, a state machine diagram illustrating a second exemplary state machine that may be employed by retry circuit 30 is shown. Other embodiments are possible and contemplated. In the illustrated embodiment, the state machine includes a first nominal state 60, a second nominal state 62, a minimum state 64, and a maximum state 66. The state machine of FIG. 4 may correspond to an embodiment of retry circuit 30 which implements four retry latencies: a minimum retry latency, a first nominal retry latency, a second nominal retry latency, and a maximum retry latency. In the first nominal state 60, retry circuit 30 selects the first nominal retry latency. Similarly, in the second nominal state 62, retry circuit 30 selects the second nominal retry latency; in the minimum state 64, retry circuit 30 selects the minimum retry latency, and, in the maximum state 66, retry circuit 30 selects the maximum retry latency. The state machine may initially (e.g., upon reset) begin at first nominal state 60 or second nominal state 62, and thus retry circuit 30 may initially select the first nominal retry latency or the second nominal retry latency.

If the state machine is in any state besides the minimum state 64 and the previous latency is greater than the maximum retry latency, the state machine transitions to minimum state 64 (arcs 68, 70, and 72, for first nominal state 60, second nominal state 62, and maximum state 66, respectively)

If the state machine is in the first nominal state 60 and the previous latency is less than the maximum retry latency but greater than the first nominal latency, the state machine transitions to the second nominal state 62 (arc 74).

If the state machine is in the second nominal state 62 and the previous latency is less than the maximum retry latency but greater than the second nominal latency, the state machine transitions to the maximum state 66 (arc 76). If the state machine is in the second nominal state 62 and the previous latency is less than the first nominal retry latency, the state machine transitions to the first nominal state 60 (arc 80).

If the state machine is in the maximum state 66, and the previous latency is less than the second nominal retry latency, the state machine transitions to the second nominal state 62 (arc 78).

If the state machine is in the minimum state 64 and the previous latency is greater than the minimum retry latency but less than the maximum retry latency, the state machine transitions to the first nominal state 60 (arc 82).

The state machine of FIG. 4 provides additional granularity to the retry latencies, and thus may allow for finer grain tuning of the retry latencies to the actual latencies of the system. Additional retry latencies may be added as desired.

In another embodiment, the transitions of arcs 78 and 80 may be eliminated. In yet another embodiment, a transition from the first nominal state 60 to the maximum state 66 may be included if the previous latency is less than the maximum retry latency but greater than the second nominal retry latency. In such an embodiment, the transition represented by arc 74 may occur if the previous latency is less than the second nominal retry latency but greater than the first nominal retry latency. Similarly, embodiments including a transition from the minimum state 64 to the second nominal state 62 and/or the maximum state 66 and from the maximum state 66 to the first nominal state 60 are contemplated.

Turning now to FIG. 5, a state machine diagram illustrating a third exemplary state machine that may be employed by retry circuit 30 is shown. Other embodiments are possible and contemplated. In the illustrated embodiment, the state machine includes a minimum state 92 and a maximum state 90. The state machine of FIG. 5 may correspond to an embodiment of retry circuit 30 which implements two retry latencies: a minimum retry latency and a maximum retry latency. In the maximum state 90, retry circuit 30 selects the maximum retry latency. Similarly, in the minimum state 92, retry circuit 30 selects the minimum retry latency. The state machine may initially (e.g., upon reset) begin at either state.

If the state machine is in maximum state 90 and the previous latency is greater than the maximum retry latency, the state machine transitions to minimum state 92 (arc 94). If the state machine is in minimum state 92 and the previous latency is less than the maximum retry latency, the state machine transitions to maximum state 90 (arc 96). Alternatively, the state machine may transition from maximum state 90 to minimum state 92 if the previous latency is less than the minimum retry latency and may transition from minimum state 92 to maximum state 90 if the previous latency is greater than the minimum retry latency. The state machine illustrated in FIG. 5 may provide for effective use of bus bandwidth through earlier retry of long latency transactions while not retrying transactions having the expected latency. The alternative state transitions may provide for fewer retries if the latency of transactions temporarily increases for the majority of transactions, but still provides for a shorter retry of long latency transactions if the majority of transactions are experiencing the expected latency.

It is noted that, while FIGS. 3–5 illustrate state machines for selecting the retry latency, the state machines are merely a convenient method for illustrating the selection of retry latencies. Some embodiments may implement the state machines while, in other embodiments, the "state" may be determined using combinatorial logic examining the latencies recorded in latency buffer 38.

Figure 6:
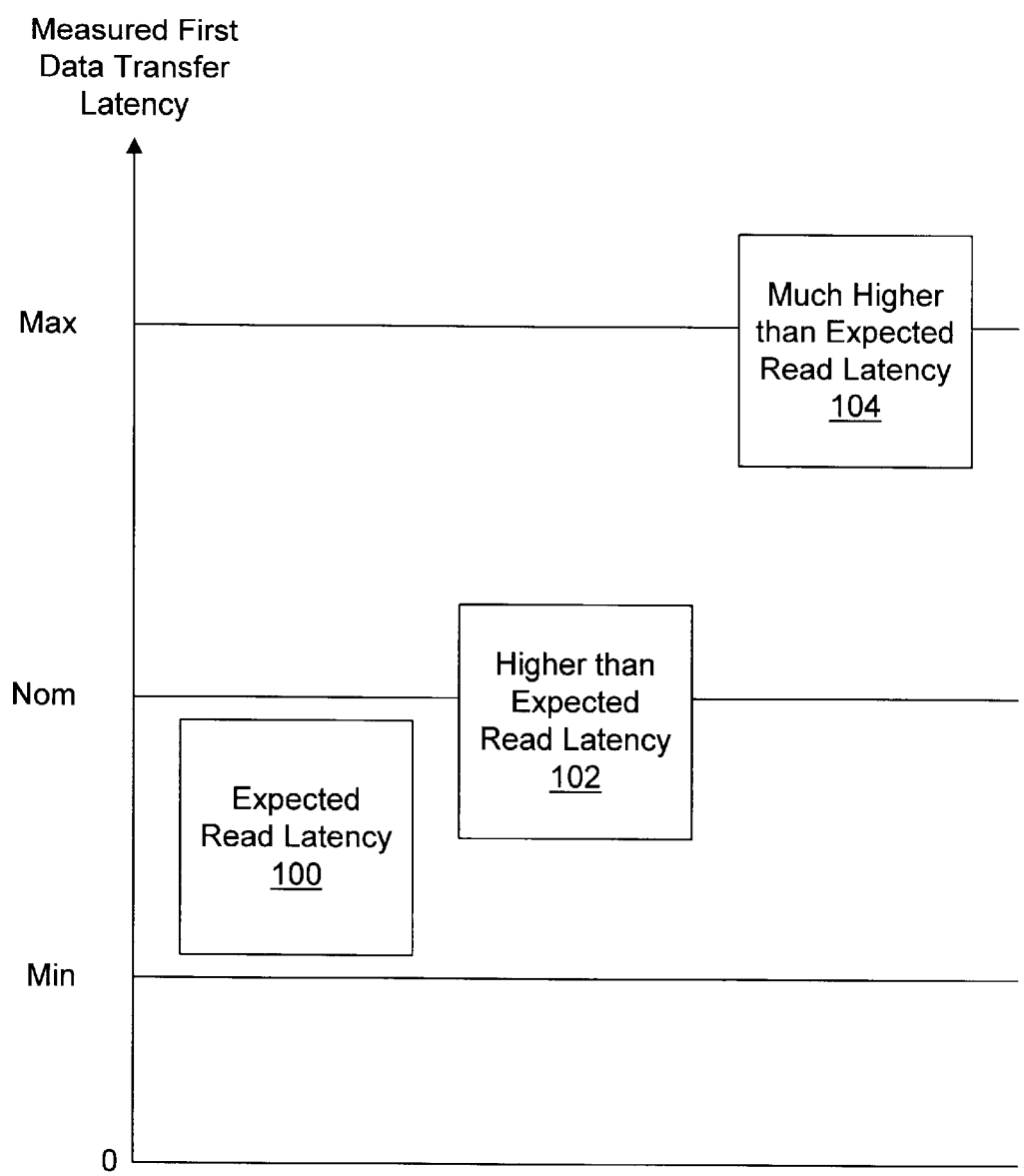
FIG. 6 is a block diagram illustrating one embodiment of an adaptive retry algorithm for exemplary latencies.

Turning next to FIG. 6, a diagram is shown illustrating the retry latencies of one embodiment of retry circuit 30 for various actual first data transfer latencies. The vertical axis in FIG. 6 is the measured first data transfer latency. Additionally illustrated on the vertical axis and by horizontal lines are the minimum retry latency (Min), the nominal retry latency (Nom) and the maximum retry latency (Max).

A square 100 illustrates a set of transactions having various first data transfer latencies below the nominal retry latency. Thus, these transactions have the expected latency, and retries may not be experienced even with the retry latency set at the nominal retry latency.

A square 102 illustrates a set of transactions having various first data transfer latencies, at least some of which are above the nominal retry latency, but which are below the maximum retry latency. In other words, the set of transactions illustrated by square 102 may be experiencing slightly higher than expected first data transfer latencies. Thus, at least some of these transactions would be retried just before the data becomes available if the retry latency is set at the nominal retry latency. Accordingly, setting the retry latency to the maximum retry latency may provide efficient bus utilization for the latencies illustrated by square 102.

A square 104 illustrates a set of transactions having various first data transfer latencies, at least some of which are above the maximum retry latency. In other words, the set of transactions illustrated by square 104 may be experiencing much higher than expected first data transfer latencies. Accordingly, setting the retry latency to the minimum retry latency may provide efficient bus utilization by retrying the transactions having latencies illustrated by square 104 early and allowing other transactions to proceed while the higher latency is experienced on bus 24.

Figure 7:
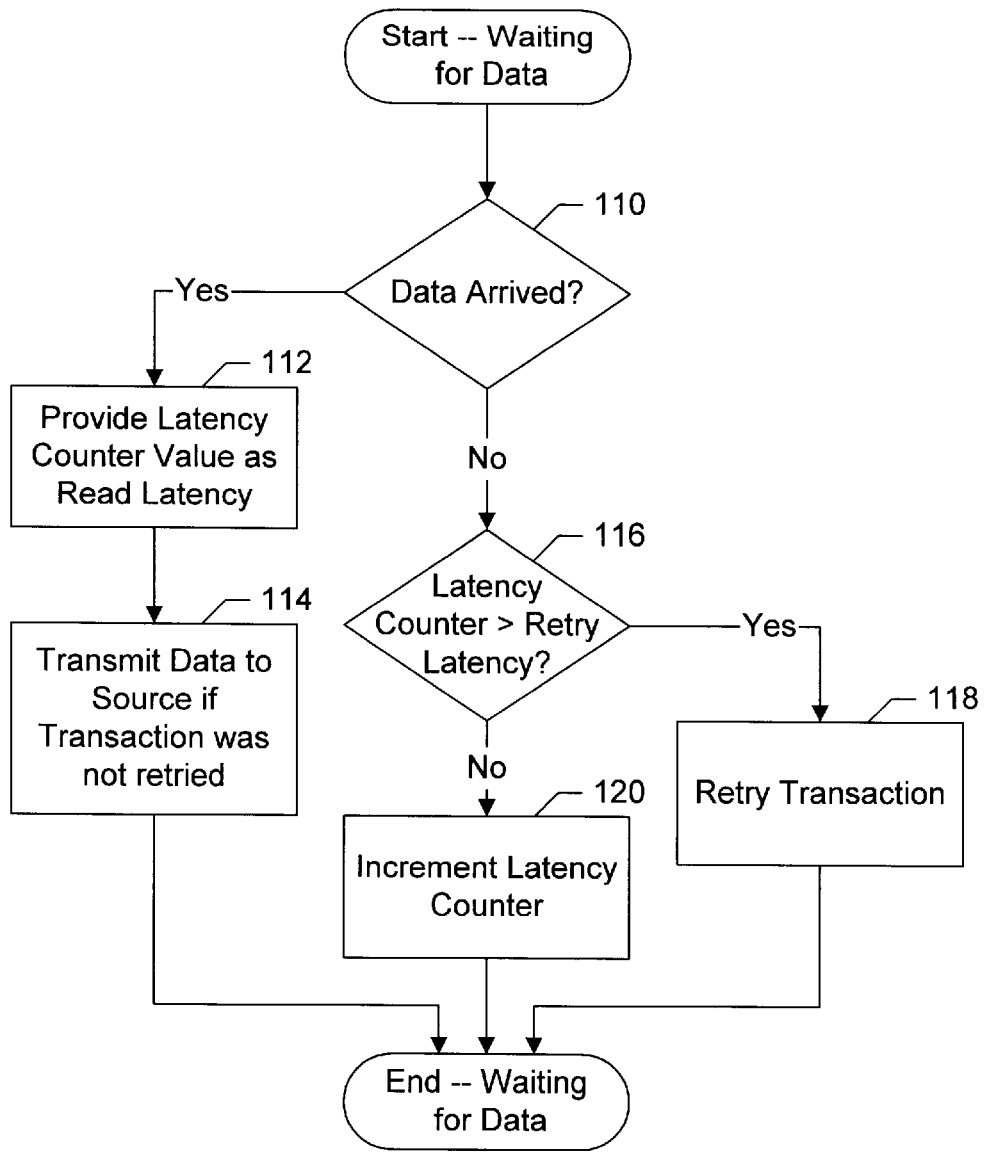
FIG. 7 is a flowchart illustrating one embodiment of retrying of an operation and measuring an operation's latency.

Turning next to FIG. 7, a flowchart illustrating operation of one embodiment of target circuit 32 while waiting for data from bus 24 for a read transaction initiated by a device on the PCI bus is shown. Other embodiments are possible and contemplated. While the blocks shown are illustrated in a particular order for ease of understanding, any suitable order may be used. Furthermore, blocks may be performed in parallel by combinatorial logic circuits in target circuit 32.

If data has arrived from bus 24 (decision block 110), target circuit 32 may provide the latency counter value from latency counter 34 as the read latency for the transaction to retry circuit 30 (block 112). Additionally, if the transaction has not been retried due to the latency exceeding the first data transfer latency, the data is transmitted on the PCI bus to the source of the read transaction (block 114). On the other hand, if the transaction has been retried, target circuit 32 may retain the data until the transaction is reattempted by the source. The data may arrive at target circuit 32 via I/O bridge 20A or directly from bus 24, depending on the embodiment.

If the latency counter for the transaction exceeds the retry latency provided by retry circuit 30 (decision block 116), target circuit 32 retries the transaction on the PCI bus (block 118). If the latency counter has not exceeded the retry latency (and data has not yet arrived for the transaction), target circuit 32 increments the latency counter (block 120). Incrementing of the latency counter may be performed in the present embodiment, with the latency counter starting at zero when the transaction is initiated on the PCI bus. Other embodiments may initialize the latency counter to the retry latency provided by retry circuit 30 at the time the transaction is initiated on the PCI bus, and decrementing of the latency counter may be performed.

It is noted that, while decision block 116 illustrates a retry if the latency counter exceeds the retry latency, the test may be greater than or equal to, if desired.

Figure 8:
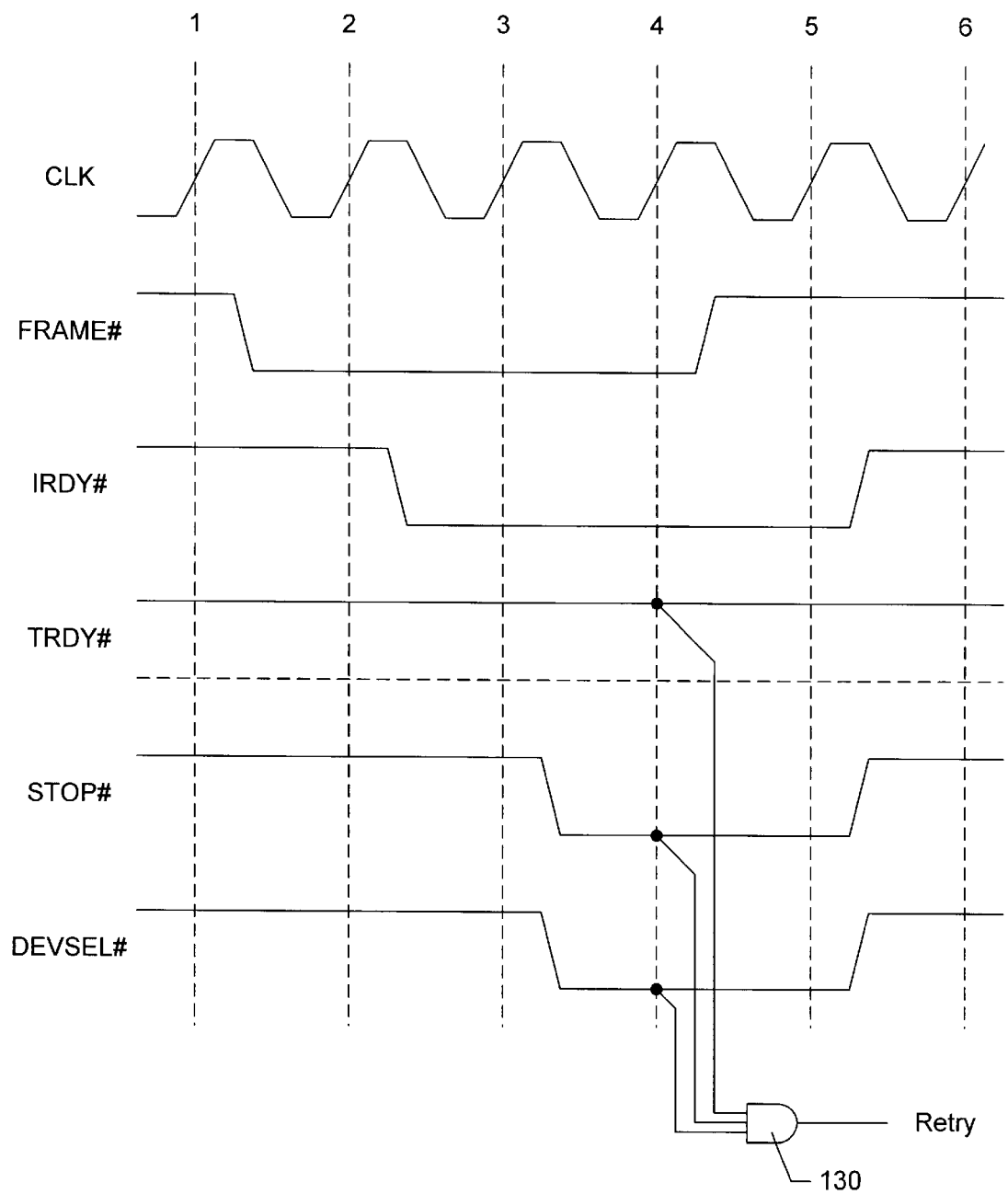
FIG. 8 is a timing diagram illustrating retry on a PCI bus.

Turning next to FIG. 8, a timing diagram illustrating retry on the PCI bus is shown. Other embodiments are possible and contemplated. Specifically, other buses may define retry in other fashions. Clock cycles in FIG. 8 are delimited by vertical dashed lines. The vertical dashed lines illustrate the sampling of signals. Each of the signals shown in FIG. 8 are defined to be active low signals (i.e. they are asserted by driving the voltage low on the corresponding line).

A transaction is initiated on the PCI bus by asserting the FRAME# signal. In FIG. 8, FRAME# is sampled asserted during clock cycle 2. Additionally, the initiator of the transaction indicates readiness to transfer data by asserting the IRDY# signal during clock cycle 3.

A target indicates recognition of the transaction as a target by asserting DEVSEL# (e.g. in clock cycle 4 in FIG. 8). Additionally, the target may retry the transaction by asserting the STOP# signal and keeping the TRDY# signal deasserted. Thus, a retry on the PCI bus is the combination of DEVSEL# being asserted, STOP# being asserted, and TRDY# being deasserted (illustrated conceptually by AND gate 130 in FIG. 8, which generates a retry output if DEVSEL# is asserted, STOP# is asserted, and TRDY# is deasserted). The initiator of the transaction recognizes the retry by sampling the DEVSEL#, STOP#, and TRDY# signals on clock cycle 4, and deasserts FRAME# (in clock cycle 5) and IRDY# (in clock cycle 6) to end the transaction. Since TRDY# remains deasserted throughout the transaction, no data is transferred.

Figure 9:
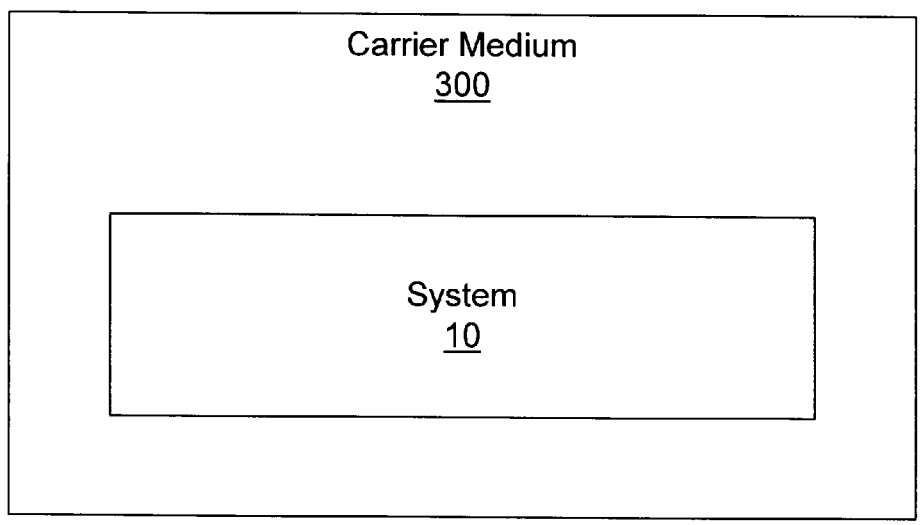
FIG. 9 is a block diagram of a carrier medium.

Turning next to FIG. 9, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any combination of an I/O interface, a retry circuit, a target circuit, configuration registers, buffers, I/O bridges, etc.

Numerous variations and modifications will become apparent to those skilled in the art once the above disclosure is fully appreciated. It is intended that the following claims be interpreted to embrace all such variations and modifications.

What is claimed is:

1. A method comprising:

establishing a plurality of retry latencies;

determining latencies of transactions on a bus, each latency representing a time period from a first event of a corresponding transaction to a second event of said corresponding transaction; and selecting a first retry latency for a first transaction from said plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time.

2. The method as recited in claim 1 further comprising:

replacing one of said latencies of said N previous transactions with a first latency of said first transaction; and selecting a second retry latency of said plurality of retry latencies for a second transaction responsive to said latencies of N previous transactions subsequent to said replacing.

3. The method as recited in claim 2 wherein said one of said latencies of N previous transactions corresponds to a least recent transaction of said previous transactions.

4. The method as recited in claim 1 wherein said plurality of retry latencies includes a minimum retry latency, a maximum retry latency, and a nominal retry latency.

5. The method as recited in claim 4 further comprising initially selecting said nominal retry latency.

6. The method as recited in claim 4 further comprising changing from said nominal retry latency to said minimum retry latency responsive to at least a first number of said latencies of N previous transactions being latencies greater than said maximum retry latency.

7. The method as recited in claim 4 further comprising changing from said nominal retry latency to said maximum retry latency responsive to at least a first number of said latencies of N previous transactions being latencies greater than said nominal retry latency and less than said maximum retry latency.

8. The method as recited in claim 4 further comprising changing from said maximum retry latency to said minimum retry latency responsive to at least a first number of said latencies of N previous transactions being latencies greater than said maximum retry latency.

9. The method as recited in claim 4 further comprising changing from said minimum retry latency to said nominal retry latency responsive to at least a first number of said latencies of N previous transactions being latencies greater than said minimum retry latency and less than said nominal retry latency.

10. The method as recited in claim 1 further comprising retrying said first transaction at said point in time if said second event does not occur before said point in time.

11. The method as recited in claim 1 wherein said first retry latency is a number of clock cycles of a bus clock corresponding to said bus.

12. The method as recited in claim 1 wherein said selecting is performed by a target of said first transaction.

13. The method as recited in claim 12 wherein said determining is performed by said target, and wherein said transactions are transactions targeting said target.

14. The method as recited in claim 1 wherein said first event is a beginning of said corresponding transaction and wherein said second event is a first data transfer of said corresponding transaction.

15. The method as recited in claim 1 wherein said determining comprises measuring said latencies.

16. The method as recited in claim 1 wherein said determining comprises calculating said latencies from multiple internal states of a system including said bus.

17. The method as recited in claim 16 wherein said multiple internal states include a memory read latency, a number of transactions queued in a memory controller, and an amount of traffic on a system bus to which said memory controller is coupled.

18. The method as recited in claim 1 wherein said establishing comprises programming one or more configuration registers with said plurality of retry latencies.

19. The method as recited in claim 1 wherein said establishing comprises fixing said plurality of retry latencies in hardware.

20. A method comprising:
determining latencies of transactions on a bus, each latency representing a time period from a first event of a corresponding transaction to a second event of said corresponding transaction; and
selecting a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time;
wherein said selecting comprises selecting a minimum retry latency of said plurality of retry latencies responsive to at least a first number of said latencies of N previous transactions being latencies greater than a maximum retry latency of said plurality of retry latencies.

21. A method comprising:
determining latencies of transactions on a bus, each latency representing a time period from a first event of a corresponding transaction to a second event of said corresponding transaction; and
selecting a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time;
wherein said selecting comprises selecting a maximum retry latency of said plurality of retry latencies responsive to: (i) a currently selected retry latency being other than a minimum retry latency of said plurality of retry latencies; and (ii) at least a first number of said latencies of N previous transactions being latencies less than said maximum retry latency and greater than said currently selected retry latency.

22. A method comprising:
determining latencies of transactions on a bus, each latency representing a time period from a first event of a corresponding transaction to a second event of said corresponding transaction; and
selecting a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time;
wherein said selecting said first retry latency is responsive to: (i) a currently selected retry latency being a minimum retry latency of said plurality of retry latencies; and (ii) at least a first number of said latencies of N previous transactions being latencies less than said first retry latency.

23. The method as recited in claim 22 wherein said first retry latency is not a maximum retry latency of said plurality of retry latencies.

24. A method comprising:
determining latencies of transactions on a bus, each latency representing a time period from a first event of a corresponding transaction to a second event of said corresponding transaction; and
selecting a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time;
wherein said first event is a previous data transfer of said corresponding transaction and said second event is a subsequent data transfer of said corresponding transaction.

25. An apparatus comprising:
a buffer configured to store latencies of transactions on a bus, each of said latencies representing a period of time from a first event of a corresponding transaction to a second event of said corresponding transaction; and
a circuit configured to select a first retry latency for a first transaction from a plurality of retry latencies responsive to latencies of N previous transactions from said buffer, wherein N is a positive integer, and wherein said plurality of retry latencies are established separate from said latencies in said buffer, said first retry latency indicative of a point in time, measured from said first event of said first transaction on said bus, that said first transaction is retried on said bus if said second event of said first transaction does not occur before said point in time.

26. The apparatus as recited in claim 25 wherein said circuit is further configured to replace one of said latencies stored in said buffer with a first latency of said first transaction, and wherein said circuit is further configured to select a second retry latency of said plurality of retry latencies for a second transaction responsive to said latencies of N previous transactions subsequent to said replacing.

27. The apparatus as recited in claim 26 wherein said buffer is a first-in, first-out buffer, and wherein one of said latencies corresponds to a least recent transaction of said previous transactions.

28. The apparatus as recited in claim 25 wherein said plurality of retry latencies includes a minimum retry latency, a maximum retry latency, and a nominal retry latency.

29. The apparatus as recited in claim 28 wherein said circuit is further configured to initially select said nominal retry latency.

30. The apparatus as recited in claim 28 wherein said circuit is further configured to change from said nominal retry latency to said minimum retry latency responsive to at least a first number of said latencies of N previous transactions being latencies greater than said maximum retry latency.

31. The apparatus as recited in claim 28 wherein said circuit is further configured to change from said nominal retry latency to said maximum retry latency responsive to at least a first number of said latencies of N previous transactions being latencies greater than said nominal retry latency and less than said maximum retry latency.

32. The apparatus as recited in claim 28 wherein said circuit is further configured to change from said maximum retry latency to said minimum retry latency responsive to at least a first number of said latencies of N previous transactions being latencies greater than said maximum retry latency.

33. The apparatus as recited in claim 28 wherein said circuit is further configured to change from said minimum retry latency to said nominal retry latency responsive to at least a first number of said latencies of N previous transactions being latencies greater than said minimum retry latency and less than said nominal retry latency.

34. The apparatus as recited in claim 25 further comprising a second circuit coupled to said first circuit, said second circuit configured to retry said first transaction at said point in time if said second event does not occur before said point in time.

35. The apparatus as recited in claim 25 wherein said first retry latency is a number of clock cycles of a bus clock corresponding to said bus.

36. The apparatus as recited in claim 25 wherein said circuit is included in a target of said first transaction.

37. The apparatus as recited in claim 36 wherein said target of said transaction is configured to measure said latencies of said transactions, and wherein said transactions are transactions targeting said target.

38. The apparatus as recited in claim 36 wherein said target of said transaction is configured to calculate said latencies from multiple internal states of a system including said apparatus.

39. The apparatus as recited in claim 38 wherein said multiple internal states include a memory read latency, a number of transactions queued in a memory controller, and an amount of traffic on a system bus to which said memory controller is coupled.

40. The apparatus as recited in claim 25 wherein said first event is a beginning of said corresponding transaction and wherein said second event is a first data transfer of said corresponding transaction.

41. The apparatus as recited in claim 25 further comprising one or more configuration registers programmable with said plurality of retry latencies to establish the plurality of retry latencies separate from said latencies in said buffer.

42. The apparatus as recited in claim 25 wherein said plurality of retry latencies are fixed in hardware.

43. An apparatus comprising:
a buffer configured to store latencies of transactions on a bus, each of said latencies representing a period of time from a first event of a corresponding transaction to a second event of said corresponding transaction; and
a circuit configured to select a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time, and wherein said first event is a previous data transfer of said corresponding transaction and said second event is a subsequent data transfer of said corresponding transaction.

44. An apparatus comprising:
a buffer configured to store latencies of transactions on a bus, each of said latencies representing a period of time from a first event of a corresponding transaction to a second event of said corresponding transaction; and
a circuit configured to select a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time, and wherein said first retry latency is a minimum retry latency of said plurality of retry latencies responsive to at least a first number of said latencies stored in said buffer being latencies greater than a maximum retry latency of said plurality of retry latencies.

45. An apparatus comprising:
a buffer configured to store latencies of transactions on a bus, each of said latencies representing a period of time from a first event of a corresponding transaction to a second event of said corresponding transaction; and
a circuit configured to select a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time, and wherein said first retry latency is a maximum retry latency of said plurality of retry latencies responsive to: (i) a currently selected retry latency being other than a minimum retry latency of said plurality of retry latencies; and (ii) at least a first number of said latencies stored in said buffer being latencies less than said maximum retry latency and greater than said currently selected retry latency.

46. An apparatus comprising:
a buffer configured to store latencies of transactions on a bus, each of said latencies representing a period of time from a first event of a corresponding transaction to a second event of said corresponding transaction; and
a circuit configured to select a first retry latency for a first transaction from a plurality of retry latencies responsive to latencies of N previous transactions, wherein N is a positive integer, said first retry latency indicative of a point in time, measured from said first event of said first transaction on said bus, that said first transaction is retried on said bus if said second event of said first transaction does not occur before said point in time, and wherein said circuit is configured to select said first retry latency responsive to: (i) a currently selected retry latency being a minimum retry latency of said plurality of retry latencies; and (ii) at least a first number of said latencies stored in said buffer being latencies less than said first retry latency.

47. The apparatus as recited in claim 46 wherein said first retry latency is not a maximum retry latency of said plurality of retry latencies.

48. A carrier medium comprising a database which is operated upon by a program executable on a computer system, the program operating on the database to perform a portion of a process to fabricate an integrated circuit including circuitry described by the database, the circuitry described in the database including:

a buffer configured to store latencies of transactions on a bus, each of said latencies representing a period of time from a first event of a corresponding transaction to a second event of said corresponding transaction; and a circuit configured to select a first retry latency for a first transaction from a plurality of retry latencies responsive to latencies of N previous transactions from said buffer, wherein N is a positive integer, and wherein said plurality of retry latencies are established separate from said latencies in said buffer, said first retry latency indicative of a point in time, measured from said first event of said first transaction on said bus, that said first transaction is retried on said bus if said second event of said first transaction does not occur before said point in time.

49. The carrier medium as recited in claim 48 wherein said circuit is further configured to replace one of said latencies stored in said buffer with a first latency of said first transaction, and wherein said circuit is further configured to select a second retry latency of said plurality of retry latencies for a second transaction responsive to said latencies of N previous transactions subsequent to said replacing.

50. The carrier medium as recited in claim 49 wherein said buffer is a first-in, first-out buffer, and wherein one of said latencies corresponds to a least recent transaction of said previous transactions.

51. The carrier medium as recited in claim 48 wherein said first retry latency is a minimum retry latency of said plurality of retry latencies responsive to at least a first number of said latencies stored in said buffer being latencies greater than a maximum retry latency of said plurality of retry latencies.

52. The carrier medium as recited in claim 48 wherein said first retry latency is a maximum retry latency of said plurality of retry latencies responsive to: (i) a currently selected retry latency being other than a minimum retry latency of said plurality of retry latencies; and (ii) at least a first number of said latencies stored in said buffer being latencies less than said maximum retry latency and greater than said currently selected retry latency.

53. The carrier medium as recited in claim 48 wherein said circuit is configured to select said first retry latency responsive to: (i) a currently selected retry latency being a minimum retry latency of said plurality of retry latencies; and (ii) at least a first number of said latencies stored in said buffer being latencies less than said first retry latency.

54. The carrier medium as recited in claim 53 wherein said first retry latency is not a maximum retry latency of said plurality of retry latencies.

55. The carrier medium as recited in claim 48 wherein said plurality of retry latencies includes a minimum retry latency, a maximum retry latency, and a nominal retry latency.

56. The carrier medium as recited in claim 55 wherein said circuit is further configured to initially select said nominal retry latency.

57. The carrier medium as recited in claim 55 wherein said circuit is further configured to change from said nominal retry latency to said minimum retry latency responsive to at least a first number of said latencies of N previous transactions being latencies greater than said maximum retry latency.

58. The carrier medium as recited in claim 55 wherein said circuit is further configured to change from said nominal retry latency to said maximum retry latency responsive to at least a first number of said latencies of N previous transactions being latencies greater than said nominal retry latency and less than said maximum retry latency.

59. The carrier medium as recited in claim 55 wherein said circuit is further configured to change from said maximum retry latency to said minimum retry latency responsive to at least a first number of said latencies of N previous transactions being latencies greater than said maximum retry latency.

60. The carrier medium as recited in claim 55 wherein said circuit is further configured to change from said minimum retry latency to said nominal retry latency responsive to at least a first number of said latencies of N previous transactions being latencies greater than said minimum retry latency and less than said nominal retry latency.

61. The carrier medium as recited in claim 48 wherein said circuitry in said database further comprises a second circuit coupled to said first circuit, said second circuit configured to retry said first transaction at said point in time if said second event does not occur before said point in time.

62. The carrier medium as recited in claim 48 wherein said first retry latency is a number of clock cycles of a bus clock corresponding to said bus.

63. The carrier medium as recited in claim 48 wherein said circuit is included in a target of said first transaction.

64. The carrier medium as recited in claim 63 wherein said target of said transaction is configured to measure said latencies of said transactions, and wherein said transactions are transactions targeting said target.

65. The carrier medium as recited in claim 63 wherein said target of said transaction is configured to calculate said latencies from multiple internal states of a system including said apparatus.

66. The carrier medium as recited in claim 65 wherein said multiple internal states include a memory read latency, a number of transactions queued in a memory controller, and an amount of traffic on a system bus to which said memory controller is coupled.

67. The carrier medium as recited in claim 48 wherein said first event is a beginning of said corresponding transaction and wherein said second event is a first data transfer of said corresponding transaction.

68. The carrier medium as recited in claim 48 wherein said first event is a previous data transfer of said corresponding transaction and said second event is a subsequent data transfer of said corresponding transaction.

* * * * *